Patented July 12, 1938

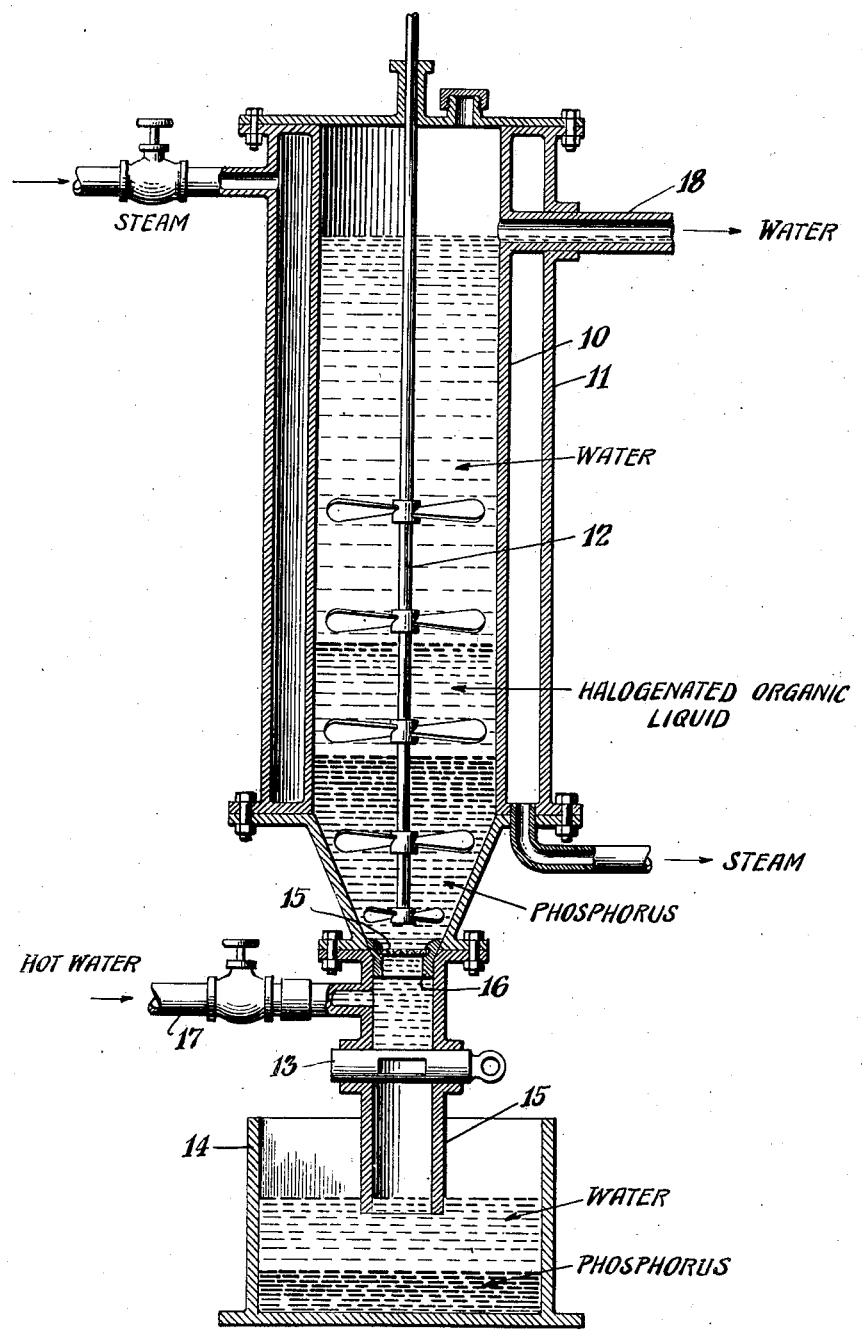

2,123,554

UNITED STATES PATENT OFFICE 2,123,554

PURIFICATION OF CRUDE PHOSPHORUS

Simon Klosky, Westfield, N. J., assignor to The American Agricultural Chemical Company, Newark, N. J., a corporation of Delaware Application March 5, 1937, Serial No. 129,174

15 Claims. (Cl. 23—223)

In the production of yellow elemental phosphorus from phosphate rock by reduction with coke or other carbonaceous reducing agent in the presence of silica, the phosphorus vapor usually carries with it into the condenser more or less foreign matter such as particles of rock, sand, and coke, with the result that when the vapor is condensed and the condensate is collected under water, more or less of the product, upon removal from the collecting vessel, is found to be of the character of a sludge, containing the above mentioned impurity particles as well as water. The elimination of the impurities is troublesome, and even a reasonably clean separation by filtering the crude product is seldom if ever possible. I have accordingly been led to devise my present invention, which has for its chief object the provision of a simple and economical, and withal effective, method of separating the phosphorus and entrained impurities of the kind indicated. A further object is to provide a method for obtaining from the crude furnace product a refined or purified product which will at least be of commercially pure grade and merchantable as such. To these and other ends the invention comprises the novel features and steps hereinafter described.

In carrying out the invention in the preferred manner, the crude yellow phosphorus, at a temperature above the melting point of the element, is thoroughly mixed with two other liquids, also at a temperature above the melting point of yellow phosphorus. One of these liquids is preferably the water of the sludge, with the addition of more water if necessary or desirable, as is usually the case. The other is an organic liquid, immiscible with liquid phosphorus and preferably wholly insoluble therein, inert to phosphorus as regards chemical reaction therewith, lighter, that is, of lower specific gravity than phosphorus, heavier than water and immiscible therewith. It is also desirable that this second liquid have a boiling point well above that of water, or at least not far below, to minimize volatilization at the temperature of operation. In general, the lower the vapor pressure of the liquid at the temperature referred to (preferably about 75° C.) the better. A slight solvent power for liquid yellow phosphorus does not, in most cases, render the liquid unsuitable, since it is soon saturated with the element and the resulting loss of the latter is therefore small. Sometimes, particularly when the rock has not been calcined before the reduction treatment, the crude furnace product is found to contain particles which apparently result from the condensation of vapors of organic substances in the uncalcined rock. I have found that a cleaner separation of such material from the liquid phosphorus can be effected by using, as the organic liquid of intermediate specific gravity, one having not only the essential characteristics indicated above, but also having what can be described as a dispersing action, causing or promoting breaking up of agglomerates of the organic matter and phosphorus, and washing the particles thereof free of any liquid phosphorus that may otherwise adhere thereto. For this liquid I prefer a halogenated organic compound of suitable specific gravity, say a benzene compound, as for example monochlorbenzene, which has a boiling point of 132° C.; or a compound of the ethylene series, of which dichlorpropylene may be mentioned as an example, with a boiling point of 97° C. Carbon tetrachloride may also be used, even though its boiling point is low. In general the preferred liquids are halogenated compounds, of which the chlorine compounds are very effective, and they also have the advantage of being relatively inexpensive. In any case the intermediate liquid is preferably one which will not volatilize too rapidly at a temperature at which the yellow phosphorus will be adequately liquid. Otherwise it may be necessary, to avoid excessive loss of the vapor, to condense and collect the latter.

After agitation of the liquid phosphorus and other liquids, the mixture is allowed to stratify according to specific gravity,—the phosphorus at the bottom, the water at the top, and the immiscible liquid of intermediate gravity in between. As the liquids separate into layers the suspended solid particles tend to sink, the rate of settling being dependent to a degree upon the size and weight of the particles, and upon the velocity of the swirling motion of the liquids, imparted thereto when the agitator is of the paddle type, rotating on a vertical axis. Very minute particles can be held by the water layer for a considerable time, especially if the layer is deep. Larger particles are held by the heavier intermediate liquid, and any particles large enough to sink quickly through the latter are arrested at the top of the underlying, more or less viscous molten phosphorus. Water at a suitable temperature, preferably about 75° C., but in any case above the melting point of phosphorus, is next passed upwardly through the phosphorus and the intermediate layer, into the water layer, with sufficient force to carry with it the solid particles and suspended matter, which it is able to pick up on the way, and float them out through the waste outlet. In this manner all but a small proportion of the fine "dirt" can be removed. Larger particles, including undissolved red phosphorus, can be removed by filtering. If after the latter operation the phosphorus is found to contain too much of the foreign matter, the treatment described, including filtering, can be repeated one or more times, until the content of foreign matter is brought down to, say, 5 per cent or less.

Convenient and simple apparatus for use in practicing the process described is shown diagrammatically in vertical section in the accompanying drawing.

The apparatus illustrated comprises a rather tall and narrow vessel 10, having a steam jacket 11 by which the contents of the vessel can be kept at a suitable temperature, preferably about 75° C., as stated above. The vertical agitator 12, rotated by any convenient means, not shown, may have paddles or vanes of the propeller type, to give a vertical mixing effect as well as a swirling motion of the liquids. Below the conical bottom of the vessel is a valve 13 for discharge of cleaned phosphorus at a point under water in the receptacle 14. One or more screens, as 15, may be provided, preferably of rather coarse mesh, to catch larger bits and pieces which might prevent operation of the valve. The screen may be carried by a removable collar 16. Above the valve is an inlet pipe 17 for delivery of the hot water to back-wash the foreign matter out through the waste outlet 18. In the back-washing operation, slow rotation of the agitator sometimes facilitates the desired upward movement of the foreign particles along with the wash water, but movement of the agitator should not be rapid enough to cause any of the phosphorus or intermediate liquid to flow out with the waste.

Filtering of the phosphorus may not always be necessary but is generally useful, especially when the washed element contains undissolved red phosphorus.

It is to be understood that the invention is not limited to the practice and apparatus herein specifically described but can be carried out in other ways and with other apparatus without departure from the spirit of the invention as defined by the appended claims.

I claim—

1. In a method of recovering liquid yellow phosphorus from a mass containing the same and foreign particles, the steps of agitating the mass with a halogenated organic liquid which is inert to phosphorus, lighter than phosphorus and immiscible therewith; allowing the mass to stratify with the phosphorus at the bottom and with foreign particles, separated from the phosphorus, held above the latter; and withdrawing the phosphorus; all while keeping the yellow phosphorus in the liquid state by maintaining it above its melting point.

2. In a method of recovering liquid yellow phosphorus from a mass containing the same and foreign particles, the steps of agitating the mass with a halogenated organic liquid which is inert to phosphorus, lighter than phosphorus and heavier than water, and immiscible with both; allowing the mass to stratify with the phosphorus at the bottom and with foreign particles, separated from the phosphorus, held above the latter in said lighter liquid; passing water upwardly through said separated particles and washing them out of said lighter liquid; and withdrawing the phosphorus; all while maintaining the yellow phosphorus in the liquid state by maintaining the temperature of the mass above the melting point of the phosphorus.

3. In a method of recovering liquid yellow phosphorus from a mass containing the same and foreign particles, the steps of agitating the mass with water and a halogenated organic liquid which is inert to phosphorus, lighter than phosphorus and heavier than water, and immiscible with both; allowing the liquids to stratify in layers with the liquid phosphorus at the bottom, and in the intermediate layer foreign particles which have been separated from the phosphorus; passing water upwardly through such separated particles to wash the same into and thereafter out of the water layer; and withdrawing the phosphorus layer; all while maintaining the yellow phosphorus in the liquid state.

4. In a method of recovering liquid yellow phosphorus from a mass containing the same, foreign particles and water, the steps comprising mixing the phosphorus with a halogenated organic liquid inert to phosphorus, intermediate to phosphorus and water in specific gravity, and immiscible with both, to separate foreign particles from the phosphorus; allowing the liquids to stratify in layers with said separated foreign particles suspended in the upper layers; and withdrawing the phosphorus layer; all while maintaining the yellow phosphorus in the molten state.

5. In a method of recovering liquid yellow phosphorus from a mass containing the same, foreign particles and water, the steps comprising mixing the phosphorus with a halogenated organic liquid inert to phosphorus, intermediate to phosphorus and water in specific gravity, and immiscible with both, to separate foreign particles from the phosphorus; allowing the liquids to stratify in layers with said separated foreign particles suspended in the upper layers; back-washing foreign particles out of the upper layers by passing water upwardly therethrough; and withdrawing the phosphorus layer; all while maintaining the yellow phosphorus in the molten state.

6. In a method of recovering liquid yellow phosphorus from a mass containing the same, foreign particles and water, the steps comprising mixing the phosphorus with a halogenated organic liquid inert to phosphorus, intermediate to phosphorus and water in specific gravity, and immiscible with both, to separate foreign particles from the phosphorus; allowing the liquids to stratify in layers with said separated foreign particles suspended in the upper layers; back-washing foreign particles out of the upper layers by passing water upwardly therethrough; and withdrawing and filtering the phosphorus layer; all while maintaining the yellow phosphorus in the molten state.

7. In a method of treating liquid yellow phosphorus containing foreign particles and water, mixing the phosphorus with a halogenated organic liquid inert to phosphorus, lighter than phosphorus and heavier than water, immiscible with both, and not more volatile than water at the temperature of operation, said agitation effecting a separation of foreign particles from the phosphorus; allowing the liquids to stratify according to their specific gravities, with foreign particles, separated from the phosphorus, suspended above the latter; and withdrawing the phosphorus layer from the layers in which said foreign particles are suspended; all while maintaining the yellow phosphorus liquid by keeping its temperature above its melting point.

8. In a method of treating liquid yellow phosphorus containing foreign particles and water, mixing the phosphorus with a halogenated organic liquid inert to phosphorus, lighter than phosphorus and heavier than water, immiscible with both, and not more volatile than water at the temperature of operation, by which agitation foreign particles in the phosphorus are separated therefrom; allowing the liquids to stratify according to their specific gravities, with foreign particles, separated from the phosphorus, suspended above the latter; back-washing the phosphorus layer and the intermediate layer to carry foreign matter therefrom into the water layer and thence out of the latter; and withdrawing and filtering the phosphorus layer; all while maintaining the temperature of the phosphorus above its melting point.

9. In a method of recovering liquid yellow phosphorus from a mass containing the same and foreign particles, the steps of agitating the mass with water and a chlorinated hydrocarbon liquid which is inert to phosphorus, lighter than phosphorus and immiscible therewith; allowing the liquids to stratify in layers with the liquid phosphorus at the bottom, and in the chlorinated hydrocarbon foreign particles which have been separated from the phosphorus; and withdrawing the phosphorus layer; all while maintaining the yellow phosphorus in the liquid state.

10. In a method of recovering liquid yellow phosphorus from a mass containing the same and foreign particles, the steps comprising mixing the phosphorus with a chlorinated hydrocarbon liquid inert to phosphorus, intermediate to phosphorus and water in specific gravity, and immiscible with both, to separate foreign particles from the phosphorus; allowing the liquids to stratify in layers with said separated foreign particles in the layer above; washing such particles out of the layer above by passing water upwardly through the same; and withdrawing the phosphorus layer; all while maintaining the yellow phosphorus in the molten state.

11. In a method of recovering liquid yellow phosphorus from a mass containing the same and foreign particles, the steps of agitating the mass with monochlorbenzene; allowing the liquids to stratify in layers with the liquid phosphorus at the bottom, and in the layer above the phosphorus foreign particles which have been separated from the latter; and withdrawing the phosphorus layer; all while maintaining the yellow phosphorus in the liquid state.

12. In a method of recovering liquid yellow phosphorus from a mass containing the same and foreign particles, the steps of agitating the mass with water and monochlorbenzene; allowing the liquids to stratify in layers with the liquid phosphorus at the bottom, and in the monochlorbenzene foreign particles which have been separated from the phosphorus; passing water upwardly through such separated particles to wash the same out of the monochlorbenzene; and withdrawing the phosphorus layer; all while maintaining the yellow phosphorus in the liquid state.

13. In a method of recovering liquid yellow phosphorus from a mass containing the same and foreign particles, the steps of agitating the mass with dichlorpropylene; allowing the liquids to stratify in layers with the liquid phosphorus at the bottom, and in the layer above the phosphorus foreign particles which have been separated from the latter; and withdrawing the phosphorus layer; all while maintaining the yellow phosphorus in the liquid state.

14. In a method of recovering liquid yellow phosphorus from a mass containing the same and foreign particles, the steps of agitating the mass with water and dichlorpropylene; allowing the liquids to stratify in layers with the liquid phosphorus at the bottom, and in the dichlorpropylene foreign particles which have been separated from the phosphorus; passing water upwardly through such separated particles to wash the same out of the dichlorpropylene; and withdrawing the phosphorus layer; all while maintaining the yellow phosphorus in the liquid state.

15. In a method of recovering liquid yellow phosphorus from a mass containing the same and foreign particles, the steps of agitating the mass with carbon tetrachloride; allowing the liquids to stratify in layers with the liquid phosphorus at the bottom, and in the layer above the phosphorus foreign particles which have been separated from the latter; and withdrawing the phosphorus layer; all while maintaining the yellow phosphorus in the liquid state.

SIMON KLOSKY.